(12) United States Patent
Rodecker

(10) Patent No.: US 9,068,620 B2
(45) Date of Patent: Jun. 30, 2015

(54) BODY MOUNT HAVING SUSPENDED RING MEMBER

(71) Applicant: The Pullman Company, Milan, OH (US)

(72) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 14/190,547

(22) Filed: Feb. 26, 2014

(65) Prior Publication Data

US 2014/0239659 A1    Aug. 28, 2014

Related U.S. Application Data

(60) Provisional application No. 61/769,934, filed on Feb. 27, 2013.

(51) Int. Cl.
*B62D 24/02* (2006.01)
*B62D 33/04* (2006.01)
*F16F 1/38* (2006.01)
*F16F 1/371* (2006.01)

(52) U.S. Cl.
CPC . *F16F 1/38* (2013.01); *B62D 24/02* (2013.01); *F16F 1/3713* (2013.01)

(58) Field of Classification Search
CPC ............ B62D 33/06; B62D 33/0604; B62D 33/0608; B62D 33/071; B62D 33/077; B62D 24/00; B62D 24/02; B62D 24/04; F16F 1/377; F16F 1/373; F16F 1/3732; F16F 1/3735; F16F 15/02; F16F 15/04

USPC ............ 296/35.1, 190.1, 190.4, 190.07; 180/89.1, 89.13

See application file for complete search history.

(56) References Cited

U.S. PATENT DOCUMENTS

| | | | | |
|---|---|---|---|---|
| 3,990,737 A | * | 11/1976 | Palmer | 296/35.1 |
| 4,014,588 A | * | 3/1977 | Kohriyama | 296/35.1 |
| 5,127,698 A | * | 7/1992 | Konig | 296/35.1 |
| 6,293,531 B1 | | 9/2001 | Kato et al. | |

(Continued)

FOREIGN PATENT DOCUMENTS

| | | |
|---|---|---|
| EP | 2 168 845 A2 | 3/2010 |
| JP | 2010-269645 | 12/2010 |

OTHER PUBLICATIONS

Search Report and Written Opinion dated Jun. 20, 2014 in corresponding PCT Application No. PCT/US2014/018940 (13 pages).

*Primary Examiner* — Gregory Blankenship
(74) *Attorney, Agent, or Firm* — Harness, Dickey & Pierce, P.L.C.

(57) ABSTRACT

A body mount supports and couples components of a vehicle. An inner support member and an outer support member of the body mount may have a circular cross-section. The inner support member may be disposed within the outer support member. The elastomeric member of the body mount may include an intermediate body and a ring portion. The intermediate body may be fixedly coupled to and between the inner support member and the outer support member. The ring portion extends from the intermediate body via a plurality of columns. A plurality of windows are formed between the plurality of columns. The plurality of columns are compressible, such that when the plurality of columns are compressed, the intermediate body and the ring portion are in contact with each other.

17 Claims, 7 Drawing Sheets

(56) References Cited

U.S. PATENT DOCUMENTS

| | | | |
|---|---|---|---|
| 6,709,046 B2 * | 3/2004 | Okazawa et al. | 296/190.07 |
| 7,261,365 B2 * | 8/2007 | Dickson et al. | 296/190.07 |
| 8,517,457 B2 * | 8/2013 | Yamamoto et al. | 296/190.07 |
| 2004/0046381 A1 | 3/2004 | Yoshida et al. | |
| 2006/0261531 A1 | 11/2006 | Kim | |
| 2008/0296817 A1 * | 12/2008 | Shand et al. | 267/140.13 |
| 2014/0239659 A1 * | 8/2014 | Rodecker | 296/35.1 |

* cited by examiner

BODY MOUNT HAVING SUSPENDED RING MEMBER

CROSS-REFERENCE TO RELATED APPLICATIONS

This application claims the benefit of U.S. Provisional Application No. 61/769,934, filed on Feb. 27, 2013. The entire disclosure of the above application is incorporated herein by reference.

FIELD

The present disclosure relates to a body mount for coupling vehicle components. More particularly, to a body mount having a suspended ring member.

BACKGROUND

This section provides background information related to the present disclosure which is not necessarily prior art.

Body mounts are commonly used in a vehicle to couple two components. A conventional body mount may include an elastomeric member disposed between an inner tube and an outer tube. The body mount may be configured such that when disposed in the vehicle, the elastomeric member falls short of abutting with the vehicle component in an unload state and abuts with the vehicle component during a loaded state. Specifically, the elastomeric member may disengage then engage with the vehicle component based on the movement of the vehicle components. In the disengaged state, the body mount allows soft travel between the vehicle components, whereas in the engaged state, the body mount provides rigid control to prevent pitch and roll of the vehicle. The engagement and disengagement between the elastomeric member and the vehicle component may generate noise, thereby affecting the noise, vibration, and harshness (NVH) characteristics of the vehicle.

SUMMARY

This section provides a general summary of the disclosure, and is not a comprehensive disclosure of its full scope or all of its features.

A body mount for supporting and coupling components of a vehicle may comprise: an inner support member, an outer support member, and an elastomeric member.

The inner support member has circular cross-section and may have a tube like configuration. The outer support member has a circular cross-section and may house the inner support member.

The elastomeric member may be disposed between the inner support member and the outer support member. The elastomeric member may include an intermediate body and a ring portion. The intermediate body may be fixedly coupled to and between the inner support member and the outer support member.

The ring portion extends from the intermediate body via a plurality of columns. The ring member may have a circular shape. The ring portion may extend beyond the inner support member and the outer support member. The plurality of columns and the ring portion may extend from the intermediate body such that a gap is defined between the ring portion and the inner support member. Furthermore, a plurality of windows are formed between the plurality of columns via the intermediate body, the ring portion, and the plurality of columns.

In a feature of the body mount, the ring portion may abut with a component of the vehicle when the body mount is arranged in the vehicle. In another feature of the body mount, the plurality of columns are compressible. In particular, when the plurality of columns are compressed the plurality of windows close such that the intermediate body and the ring portion are in contact. This creates a stiffer spring rate for rigid control without body disengagement. Specifically, the ring portion remains in contact with the body at all times via the columns, thereby reducing NVH.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
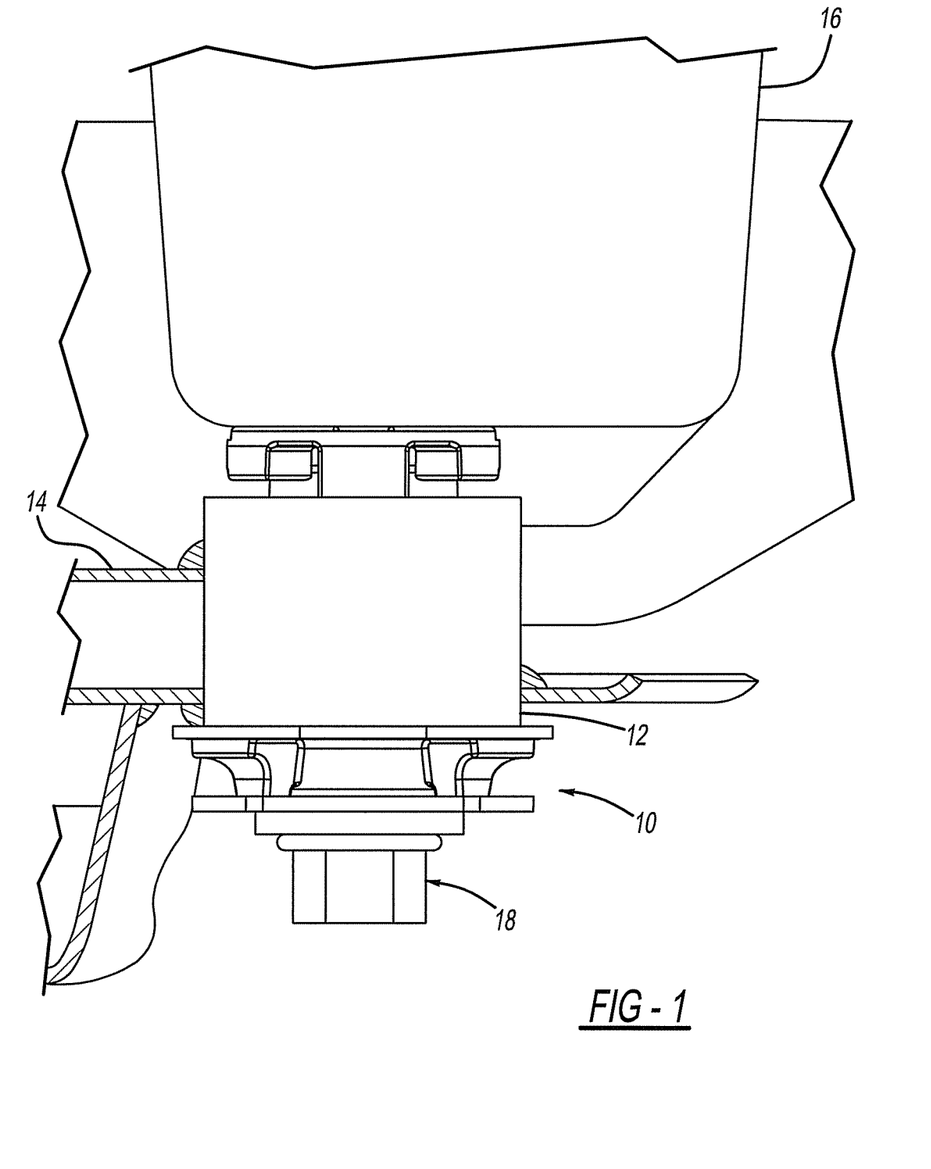
FIG. 1 is a perspective view of an example body mount disposed between two vehicle components.

The present disclosure will now be described more fully with reference to the accompanying drawings. With reference to FIGS. 1-4, an example of a body mount 10 is now presented. The body mount 10 couples two components of a vehicle. For example, as shown in FIG. 1, the body mount 10 is fixedly disposed in a bracket 12. The bracket 12 is fixedly coupled to a first component 14. The body mount 10 may be pressed-fit to the bracket 12. The body mount 10 couples the first component 14 to a second component 16, such as the vehicle body, via a fastener 18. In the example embodiment, the fastener 18 includes a bolt, a ferrule, and a nut (not shown). It would be appreciated by one skilled in the art that other suitable fasteners may also be used for coupling the body mount 10 between the first component 14 and the second component 16.

As shown in FIGS. 2A-4, the body mount 10 includes an inner support member 20, an outer support member 22, and an elastomeric member 24. The inner support member 20 defines an opening 26 for receiving the fastener 18. The inner support member 20 may have a cylindrical shape like a tube.

The outer support member 22 may have a cylindrical shape like a tube or a barrel. The outer support member 22 may have an inward flange 27 at one end and a brim 28 or outward flange on the other end. The outer support member 22 supports the elastomeric member 24. The inner support member 20 is arranged within the outer support member 22. The inner support member 20 and the outer support member 22 may be made of metal or plastic.

Figure 4:
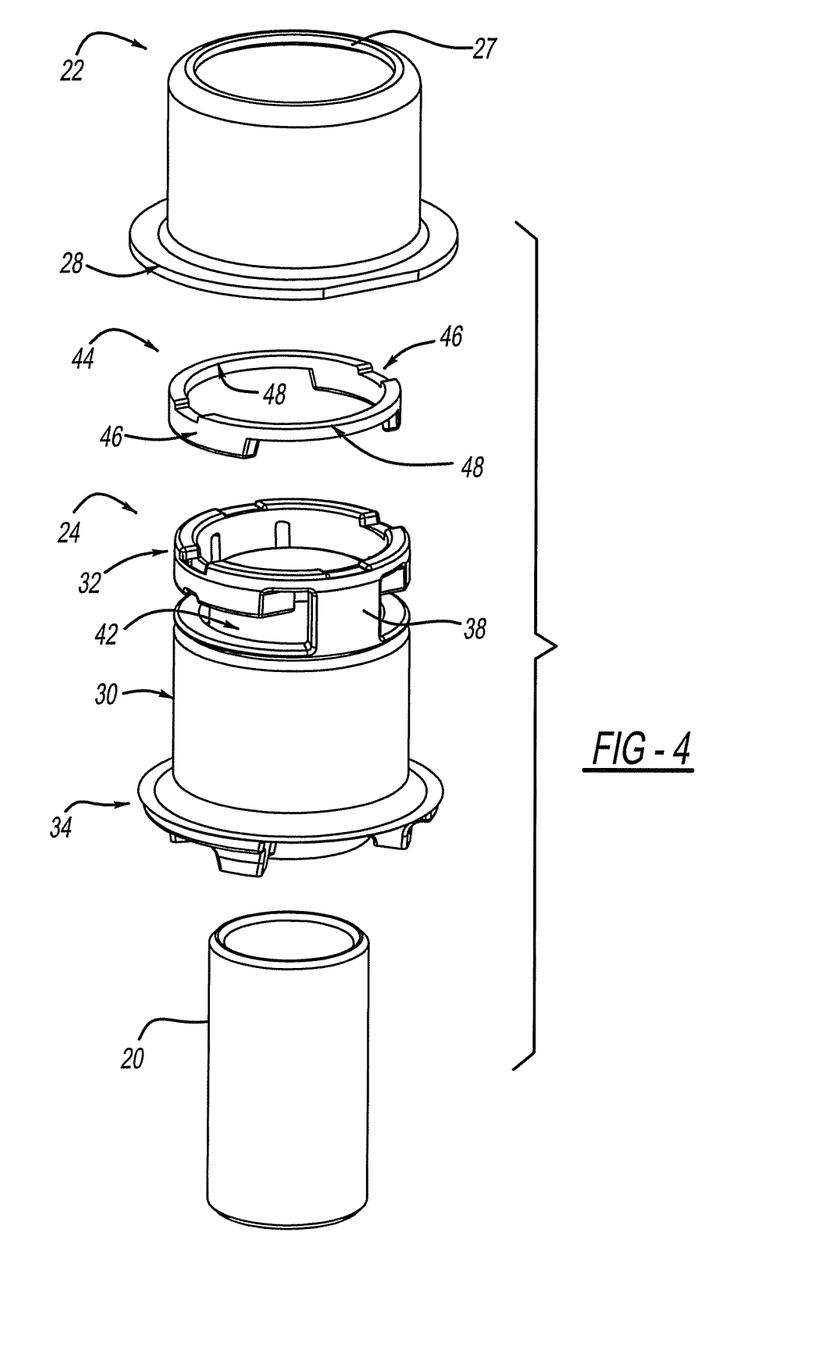
FIG. 4 is an exploded view of the body mount.

The elastomeric member 24 is formed as one piece (FIG. 4). The elastomeric member 24 is fixedly disposed between the inner support member 20 and the outer support member 22. For example, the elastomeric member 24 may be molded between the inner support member 20 and the outer support member 22. In the example embodiment, the elastomeric member 24 includes an intermediate body 30, a ring portion 32, and a bumper 34.

The intermediate body 30 is fixedly disposed between the inner support member 20 and the outer support member 22. The intermediate body 30 extends radially from an outer surface of the inner support member 20 to an inner surface of the outer support member 22, thereby coupling the inner support member 20 and the outer support member 22.

The intermediate body 30 may define a plurality of voids 36. The voids 36 extend along a longitudinal axis of the body mount 10. Specifically, the voids 36 may extend from a position substantially close to the inward flange 27 to the other end of the intermediate body 30 close to the brim 28. In the example embodiment, the intermediate body 30 has two voids 36. Alternatively, more than two voids may be arranged within the intermediate body 30. The voids create a softer rate along the radial/void direction.

The ring portion 32 extends from the intermediate body 30 via a plurality of columns 38. The ring portion 32 extends beyond an end of the inner support member 20 and the inward flange 27 of the outer support member 22. The ring portion 32 is suspended above the inner support member 20 and the outer support member 22 by the columns 38. The ring portion 32 has a circular shape. The columns 38 support the ring portion 32 such that the ring portion 32 abuts with, for example, the second component 16 (i.e., vehicle body). The columns 38 are arranged equidistant from each other and are compressible. While two columns 38 are depicted in the drawings, more than two columns may be employed to extend the ring portion 32 from the intermediate body 30.

Figures 3A, 3B:
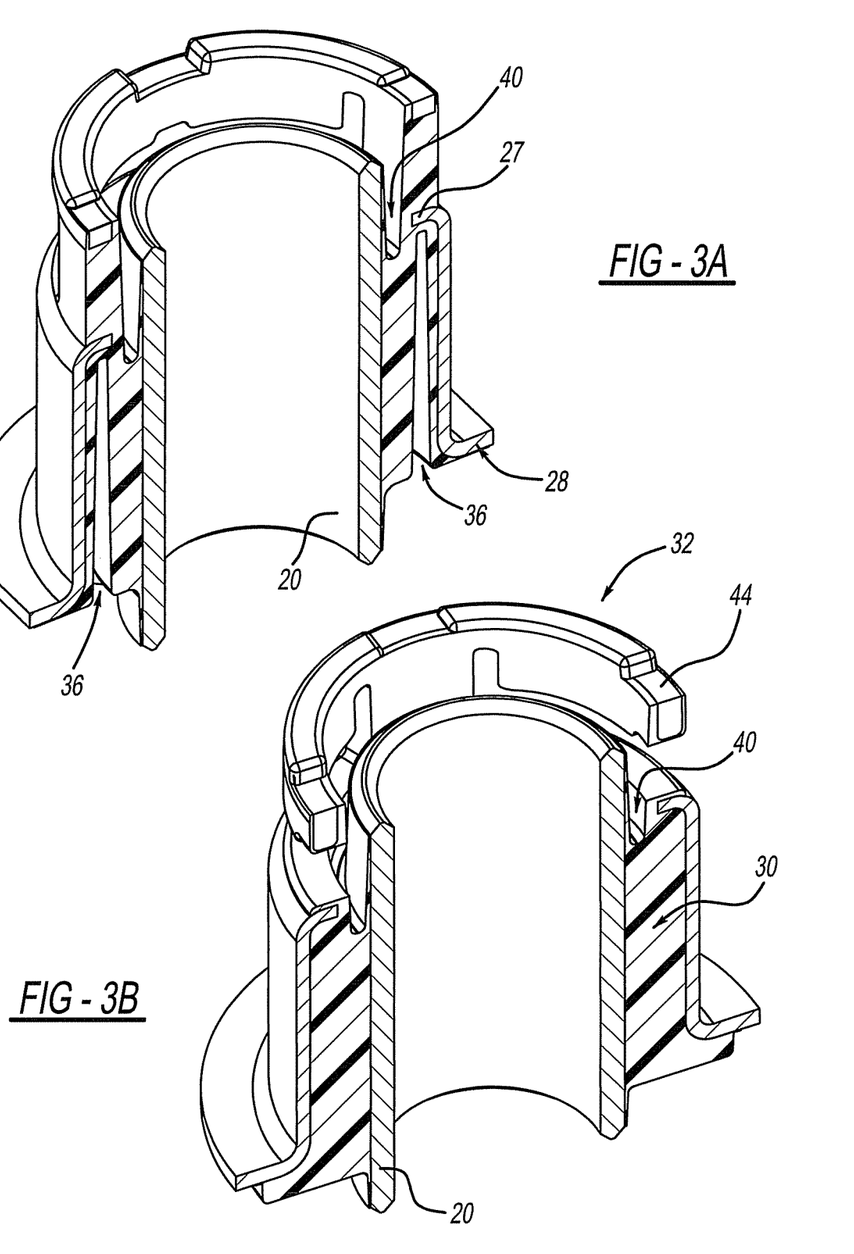
FIGS. 3A and 3B are cross-sectional views of the body mount.

A gap 40 is defined between the ring portion 32 and the inner support member 20. The gap 40 extends circumferentially around the inner support member 20. The gap 40 may extend along the longitudinal axis into the intermediate body 30 up to or slightly past or beyond the inward flange 27 of the outer support member 22. The gap 40 and the voids 36 are arranged separate from each other with the intermediate body 30 disposed between (FIGS. 3A and 3B). The gap 40 radially separates the columns 38 and the ring portion 32 from the inner support member 20. The gap 40 reduces an axial strain generated when the body mount 10 is in operation.

The intermediate body 30, the ring portion 32, and the columns 38 form a plurality of windows 42. Specifically, the elastomeric member 24 defines the windows 42 between the columns 38 with the top and bottom perimeter of the window 42 being framed by the intermediate body 30 and the ring portion 32. While two windows are depicted in the drawings, it would be appreciated by one skilled in the art that based on the number of columns 38, the body mount 10 may have more than two windows 42.

The ring portion 32 may include a rigid member 44. The ring portion 32 may be molded over the rigid member 44, such that the rigid member 44 is disposed substantially within the ring portion 32. The rigid member 44 may be made of metal, plastic, or other suitable materials. The rigid member 44 has a circular ring shape. In the example embodiment, the thickness of the rigid member 44 may be varied, such that different portions of the rigid member 44 have different thicknesses. For example, as shown in FIG. 4, a first portion 46 of the rigid member 44 has a thickness greater than a second portion 48 of the rigid member 44. The rigid member 44 is aligned in association with the ring portion 32 such that the first portion 46 is positioned above the window 42 and the second portion 48 is positioned above the columns 38.

The rigid member 44 reinforces and strengthens the ring portion 32. Furthermore, the rigid member 44 provides quick and clean travel stop when the columns 38 are compressed, as described in detail below. While the rigid member 44 is depicted as having a varied thickness, the thickness may also be the same or, in other words, uniform. The rigid member 44 may have various suitable configurations for reinforcing the ring portion 32 and is not limited to the configuration depicted in the drawings. Furthermore, based on the performance standard of the body mount 10, the ring portion 32 may not include the rigid member 44.

Figure 2A:
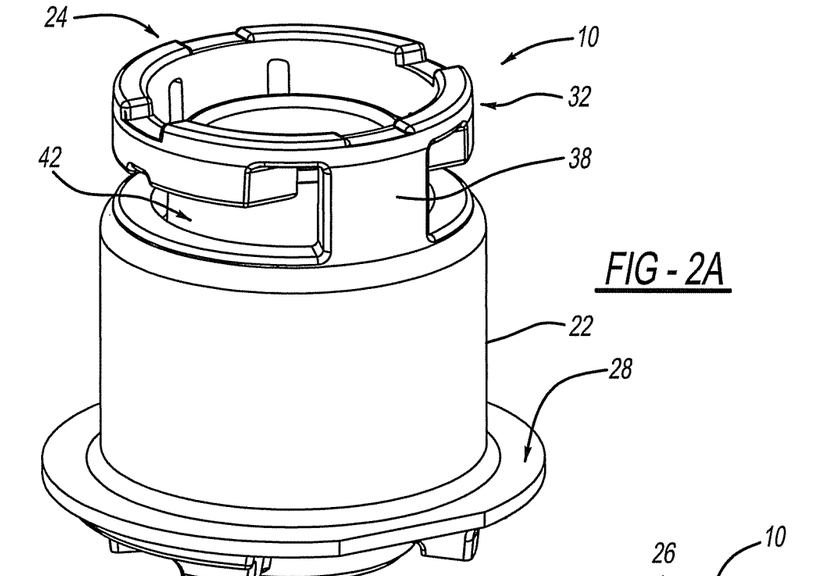
FIGS. 2A and 2B are perspective views of the body mount.
Figure 2B:
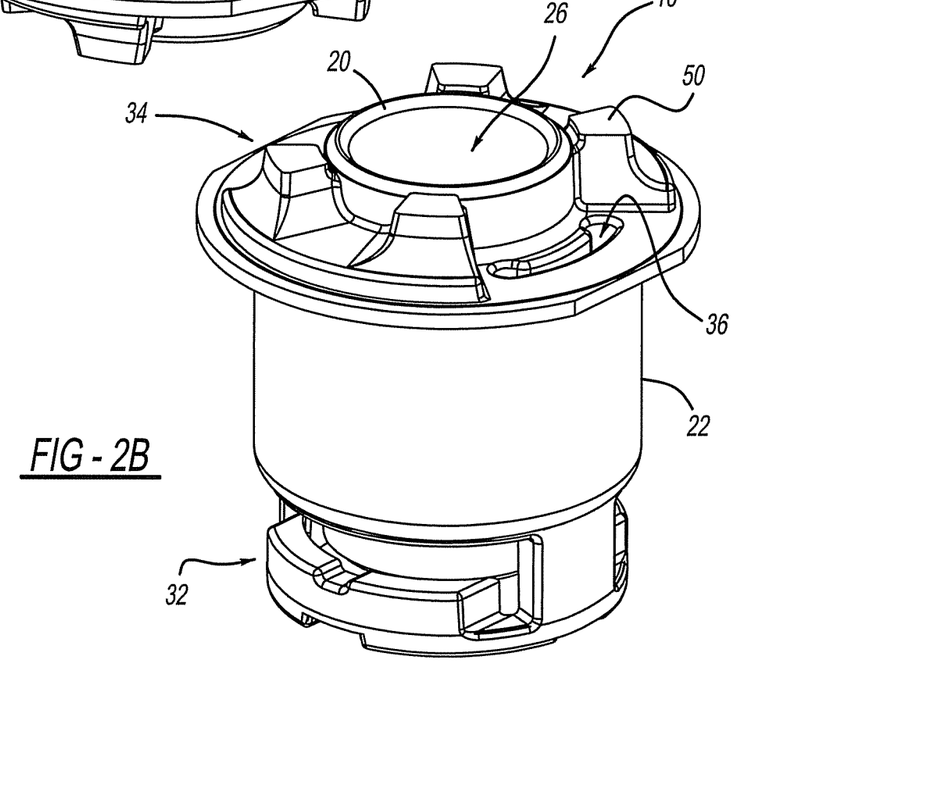

The bumper 34 of the elastomeric member 24 extends from an end of the intermediate body 30 that is opposite to the ring portion 32. Specifically, the bumper 34 extends beyond the brim 28 of the outer support member 22. The bumper 34 includes multiple spokes 50 that extend radially from the outer surface of the inner support member 20. The spokes 50 also protrude slightly beyond an end of the inner support member 20 (FIG. 2B). In the example embodiment, the bumper 34 abuts with the second component 16.

In the example embodiment, four spokes 50 are arranged around and extend from the inner support member 20. It would be appreciated by one skilled in the art that the spoke portion 34 may include less than or more than four spokes 50. While the spokes 50 are depicted as having a parabolic cross-section (FIG. 2), or a tapered shape (FIGS. 5A-7B), the spokes 50 may be configured to other suitable shapes and, therefore, is not limited to the shapes depicted in the drawings.

The elastomeric member 24 extends beyond the outer support member 22 and the inner support member 20. At one end of the body mount 10, the elastomeric member 24 has the ring portion 32 which is suspended over the outer support member 22 and the inner support member 20. The ring portion 32 is coupled to the outer support member 22 via the columns 38. The gap 40 radially separates the ring portion 32 and the columns 38 from the inner support member 20.

In the example embodiment, as illustrated in FIG. 1, the body mount 10 couples the first component 14 and the second component 16 of the vehicle. When assembled in the vehicle, the body mount 10 is fixedly disposed in the bracket 12, thereby coupling the body mount 10 to the first component 14. The bolt of the fastener 18 is received by the body mount 10 and extends through the inner support member 20 and the second component 16. The body mount 10 may then be coupled to the second component 16 via the bolt and a nut which secures the bolt to the second component 16.

One end of the body mount 10 abuts with a vehicle component (e.g., second component 16). The other end of the body mount 10 abuts with, for example, a ferrule or a washer (e.g., part of fastener 18). Specifically, the bumper 34 abuts with the ferrule or washer, and the ring portion 32 abuts with the vehicle body. The elastomeric member 24 extends from one end of the body mount 10 to the other end, such that the elastomeric member 24 abuts with both, the vehicle component and the fastener. Accordingly, the body mount 10 is in direct contact with the vehicle component (vehicle body) and the fastener via the elastomeric member 24.

It would be appreciated by one skilled in the art that the body mount 10 may be arranged between other suitable vehicle components and is not limited to the arrangement depicted. For example, the bracket 12 for receiving the body mount 10 may be arranged on the second component 16 such that the body mount 10 is fastened to the first component 14 via the bolt and nut.

Figure 5A:
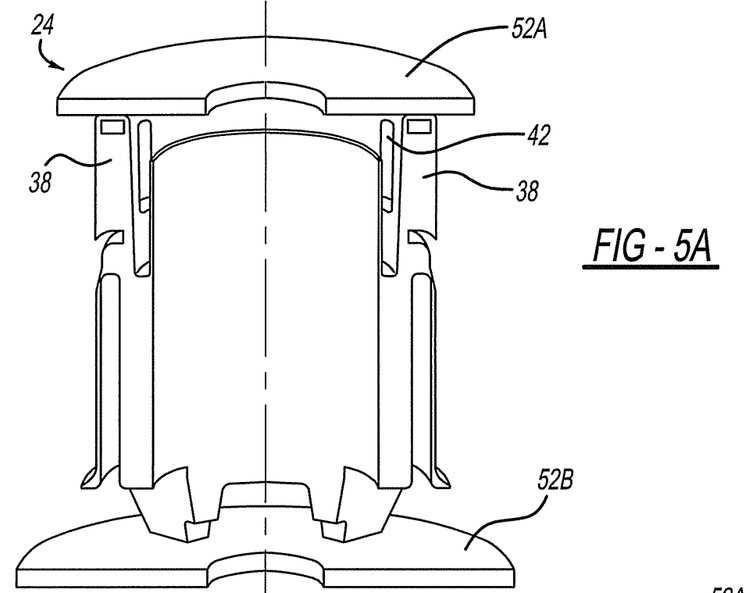
FIG. 5A is a cross-sectional view of an elastomeric member of the body mount in a non-compressed state without an inner support member.
Figure 5B:
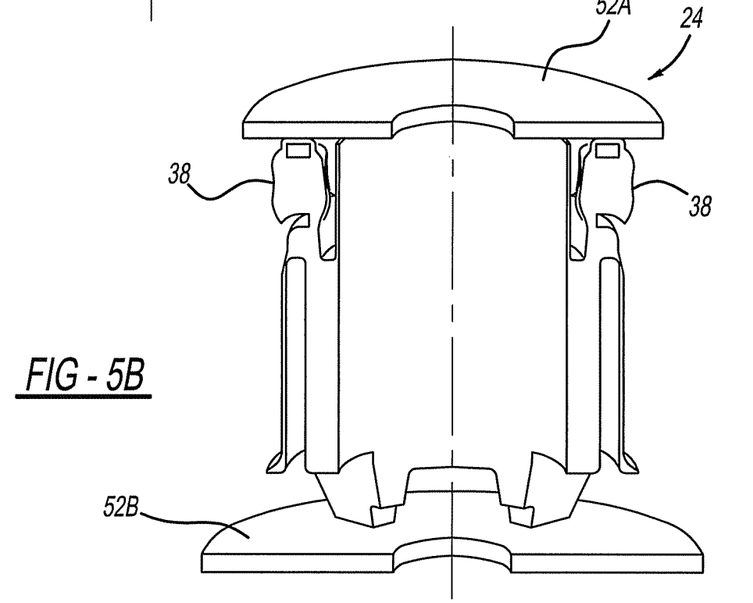
FIG. 5B is a cross-sectional view of the elastomeric member of the body mount in a compressed state without the inner support member.

In operation, the body mount 10 permits soft travel and rigid control via the elastomeric member 24. With reference to FIGS. 5A and 5B, an explanation of the elastomeric member 24 during operation of the body mount is presented. For simplicity, only the elastomeric member 24 is depicted between two washers 52A, 52B. Washer 52A represents the vehicle component and washer 52B represents, for example, a ferrule of the fastener 18.

As provided above, the columns 38 are detached from the inner support member 20 via the gap 40. Accordingly, as the vehicle components travel, the columns 38 move. As the columns 38 move, the ring portion 32 and the bumper 34 remain in contact with the washers 52A, 52B.

During larger movements between the vehicle components, the columns 38 buckle. More particularly, the columns 38 collapse, thereby closing the windows 42 (FIG. 5B). Accordingly, travel between the vehicle components is restricted. While the columns 38 buckle, the ring portion 32 and the bumper 34 remain in contact with the washers 52 A, B. When the columns 38 are collapsed and the windows 42 closed, the body mount 10 stiffens, providing rigid control and support between the vehicle components.

As provided above, the rigid member 44 reinforces the ring portion 32. When the vehicle components move relative to each other, the body mount 10 may compress and extend. During compression, the rigid member 44 may exert a uniform force onto the columns 38. The columns 38 may then collapse at the same time for a cleaner, quicker travel stop.

The body mount 10 maintains contact with the vehicle component/fastener. In particular, the ring portion 32 extends beyond the inner support member 20. The ring portion 32 maintains contact with the vehicle component/fastener via the columns 38 and windows 42, thereby preventing disengagement between the body mount 10 and the vehicle body during soft travel. The columns 38 and windows 42 buckle during peak loads such as during jounce and rebound. When the columns 38 are in a buckled state, the body mount 10 provides rigid control to prevent pitch and yaw of the vehicle. Accordingly, the body mount 10 is fully engaged with the vehicle body while providing soft rate of travel and stiff rigid control.

Figure 6A:
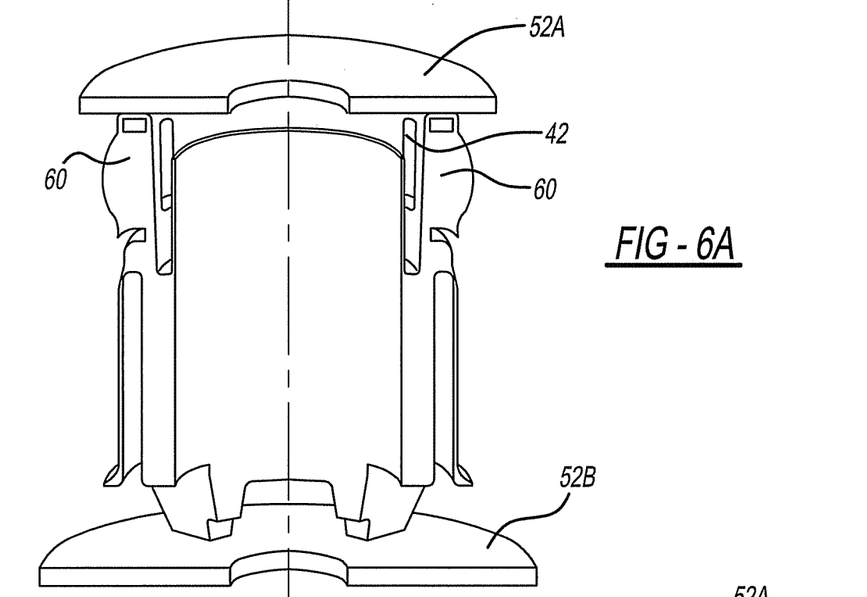
FIGS. 6A and 6B are a cross-sectional views of the elastomeric member of the body mount having a convex shape column in non-compressed and compressed state without the inner support member.
Figure 6B:
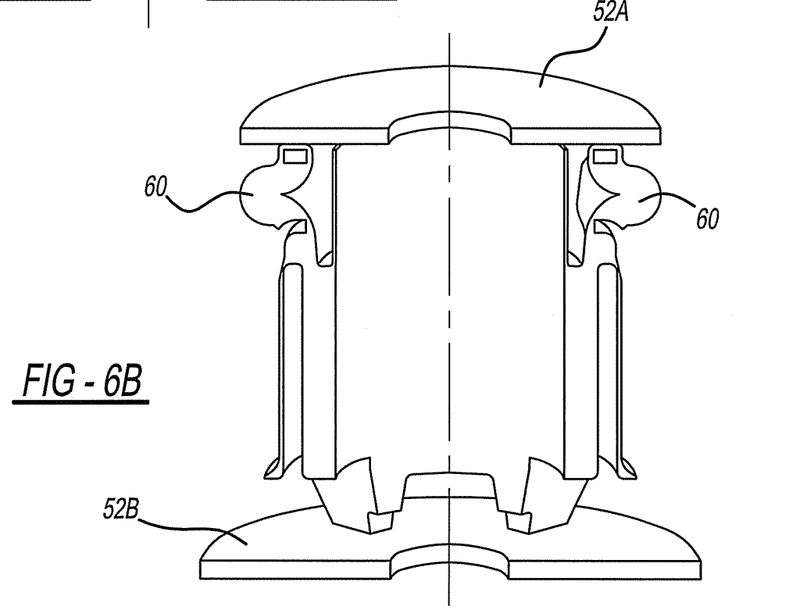

In the example embodiment, as shown in FIGS. 5A-5B, the columns 38 have a straight profile or cross-section. The straight profile allows the columns 38 to compress outward or inward. Alternatively, as shown in FIGS. 6A-6B, the body mount 10 may have columns 60. The columns 60 have a convex shape which biases the columns 60 to compress outward. In particular, the columns 60 move to compensate for soft travel between the vehicle components. During larger movements between the vehicle components, the columns 60 collapse and protrude outward. As provided above, the body mount 10 maintains contact with the vehicle component and the fastener via the ring portion 32 and the bumper 34 of the elastomeric member 24.

Figure 7A:
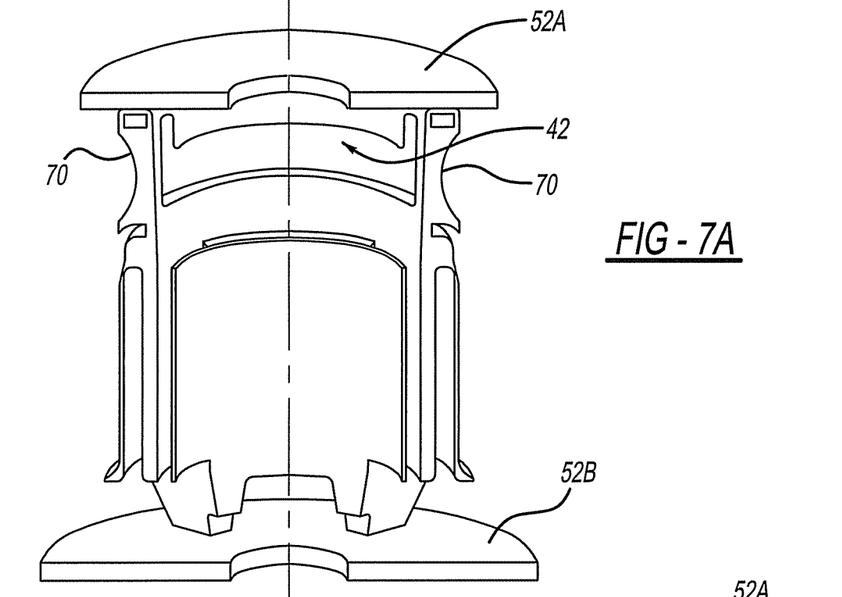
FIGS. 7A and 7B are cross-sectional views of the elastomeric member of the body mount having a concave shape column in non-compressed and compressed state without the inner support member.
Figure 7B:
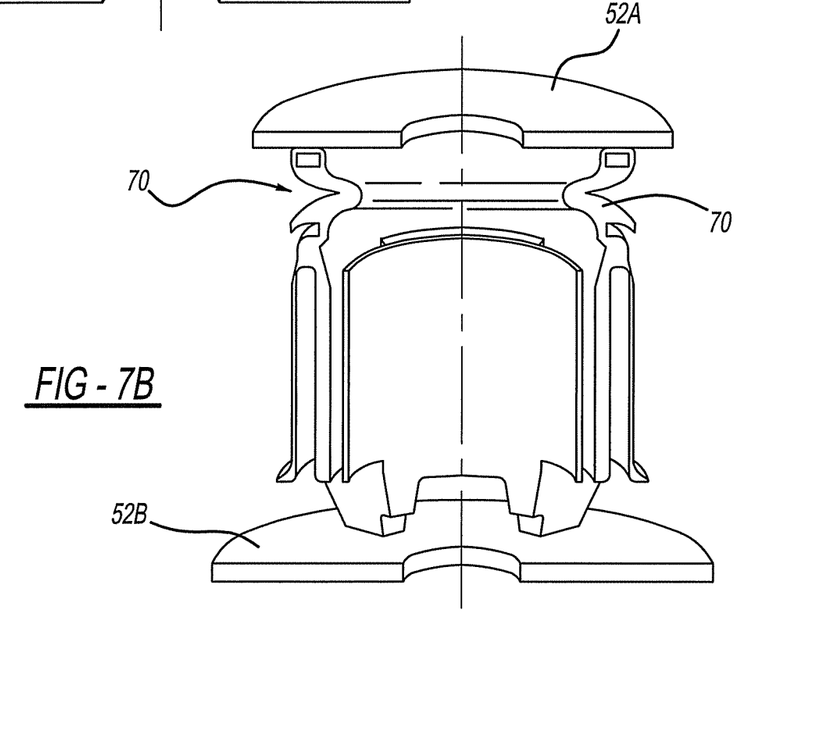

In another variation, the body mount 10 may include columns 70, as shown in FIGS. 7A and 7B. The columns 70 have a concave shape which biases the columns 70 to compress inward. In particular, the columns 70 move to compensate for soft travel between the vehicle components. During larger movements between the vehicle components, the columns 70 collapse and protrude inward. The appropriate shape for the columns may be based on the performance requirement of the body mount 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, and/or sections, these elements, components, and/or sections should not be limited by these terms. These terms may be only used to distinguish one element, component, or section from another. Terms such as "first," "second," and other numerical terms when used herein do not imply a sequence or order unless clearly indicated by the context. Thus, a first element, component, or section discussed below could be termed a second element, component, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A body mount for supporting and coupling components of a vehicle, the body mount comprising:
    an inner support member defining an opening for receiving a fastener assembly;
    an outer support member housing the inner support member; and
    an elastomeric member disposed between the inner support member and the outer support member and longitudinally extending beyond the inner support member and the outer support member, and including
        an intermediate body fixedly coupled to the inner support member and the outer support member, and
        a ring portion extending from the intermediate body via a plurality of columns, the ring portion having a circular shape and extending beyond the inner support member and the outer support member, wherein the plurality of columns and the ring portion extend from the intermediate body such that a gap is defined between the ring portion and the inner support member, and the intermediate body, the ring portion, and the plurality of columns form a plurality of windows.

2. The body mount of claim 1 wherein the plurality of columns are compressible and the plurality of windows close such that the intermediate body and the ring portion are in contact with each other when the plurality of columns are compressed.

3. The body mount of claim 1 wherein the elastomeric member further comprises:
    a bumper extending from an end of the intermediate body opposite of the ring portion, wherein the bumper extends beyond an end of the outer support member and includes a plurality of spokes protruding radially outward from an outer surface of the inner support member.

4. The body mount of claim 1 further comprising a rigid ring disposed within the ring portion of the elastomeric member.

5. The body mount of claim 1 wherein the ring portion is suspended above the intermediate body when the plurality of columns are in an extended state, and the ring portion abuts with intermediate body when the plurality of columns are in a compressed state.

6. The body mount of claim 1 wherein an outer surface of the plurality of columns has a convex shape.

7. The body mount of claim 1 wherein an outer surface of the plurality of columns has a concave shape.

8. The body mount of claim 1 wherein an outer surface of the plurality of columns has a linear shape.

9. A body mount for supporting and coupling components of a vehicle, the body mount comprising:
    an outer support member having a circular cross-section;
    an inner support member having a circular cross-section and being arranged within the outer support member; and
    an elastomeric member disposed between the inner support member and the outer support member and longitudinally extending beyond the inner support member and the outer support member, the elastomeric member being one piece and including
        an intermediate body extending radially from an outer surface of the inner support member to an inner surface of the outer support member, wherein the inner support member is coupled to the outer support member by way of the intermediate body, and
        a ring portion extending from the intermediate body via a plurality of columns, the ring portion extending beyond a first end of the inner support member and a first end of the outer support member, and a plurality of windows are formed between the plurality of columns via the intermediate body, the ring portion, and the plurality of columns, wherein the ring portion abuts with a first component of the vehicle.

10. The body mount of claim 9 wherein the outer surface of the inner support member is detached from the plurality of columns and the ring portion.

11. The body mount of claim 9 wherein the plurality of columns are compressible and the plurality of windows close such that the intermediate body and the ring portion are in contact with each other when the plurality of columns are compressed.

12. The body mount of claim 9 further comprising:
    a bumper extending from an end of the intermediate body opposite of the ring portion, wherein the bumper extends beyond a second end of the outer support member and a second end of the inner support member, and the bumper abuts with a second component of the vehicle.

13. The body mount of claim 9 further comprising a rigid ring disposed within the ring portion of the elastomeric member, wherein the rigid ring circumferentially extends within the ring portion.

14. A body mount for supporting and coupling components of a vehicle, the body mount comprising:
    an outer support member having a circular cross-section;
    an inner support member having a circular cross-section and being arranged within the outer support member;
    an elastomeric member disposed between the inner support member and the outer support member and longitudinally extending beyond the inner support member and the outer support member, the elastomeric member being one piece and including
        an intermediate body extending radially from an outer surface of the inner support member to an inner surface of the outer support member, wherein the inner support member is coupled to the outer support member by way of the intermediate body,
        a first end portion extending from a first end of the intermediate body via a plurality of columns, the first end portion having an annular shape and extending passed a first end of the inner support member and a first end of the outer support member, wherein the first end portion and the plurality of columns are detached from the outer surface of the inner support member, and
        a second end portion extending from a second end of the intermediate body opposite of the first end portion, wherein the second end portion extends beyond a second end of the outer support member and a second end of the inner support member; and
    a rigid ring disposed within the first end portion of the intermediate body.

15. The body mount of claim 14 wherein the second end portion of the elastomeric member includes a plurality of spokes that protrude radially from an outer surface of the inner support member.

16. The body mount of claim 14 wherein the plurality of columns are compressible and the plurality of windows close such that the intermediate body and the first end portion are in contact with each other when the plurality of columns are compressed.

17. The body mount of claim 14 wherein when arranged in the vehicle, the first end portion of the elastomeric member continuously abuts with a first component of the vehicle and the second end portion of the elastomeric member continuously abuts with a second component of the vehicle.

* * * * *